(12) United States Patent
Weber

(10) Patent No.: US 9,774,468 B2
(45) Date of Patent: Sep. 26, 2017

(54) HOME COMMUNICATION NETWORK

(75) Inventor: Christoph Weber, Furtwangen (DE)

(73) Assignee: S. SIEDLE & SOHNE TELEFON & TELGRAFENWEKE OHG, Furtwangen (DE)

( * ) Notice: Subject to any disclaimer, the term of this patent is extended or adjusted under 35 U.S.C. 154(b) by 85 days.

(21) Appl. No.: 14/119,916

(22) PCT Filed: May 25, 2012

(86) PCT No.: PCT/EP2012/059918
§ 371 (c)(1),
(2), (4) Date: Nov. 25, 2013

(87) PCT Pub. No.: WO2012/168104
PCT Pub. Date: Dec. 13, 2012

(65) Prior Publication Data
US 2014/0092778 A1    Apr. 3, 2014

(30) Foreign Application Priority Data

Jun. 6, 2011 (DE) .................. 10 2011 077 013

(51) Int. Cl.
| H04L 12/28 | (2006.01) |
| H04L 12/46 | (2006.01) |
| H04L 12/40 | (2006.01) |
| H04L 29/08 | (2006.01) |
| H04L 29/06 | (2006.01) |

(52) U.S. Cl.
CPC ........ *H04L 12/283* (2013.01); *H04L 12/2816* (2013.01); *H04L 12/2836* (2013.01); *H04L 12/40045* (2013.01); *H04L 12/462* (2013.01); *H04L 12/4641* (2013.01); *H04L 67/2823* (2013.01); *H04L 63/0272* (2013.01); *H04L 63/0823* (2013.01); *H04L 2012/285* (2013.01)

(58) Field of Classification Search
CPC ............. H04L 12/2818; H04L 12/2825; H04L 12/2803; H04L 12/2807; H04L 12/2809
See application file for complete search history.

(56) References Cited

U.S. PATENT DOCUMENTS

| 6,756,998 | B1* | 6/2004 | Bilger ........................... 715/764 |
| 8,234,363 | B1* | 7/2012 | Kuo ..................... H04L 12/2803 370/329 |
| 2002/0009078 | A1 | 1/2002 | Wilson et al. |
| 2004/0042454 | A1 | 3/2004 | Zabihi et al. |
| 2006/0209857 | A1* | 9/2006 | Hicks ............................ 370/401 |
| 2008/0074258 | A1* | 3/2008 | Bennett et al. ................ 340/541 |
| 2009/0083374 | A1* | 3/2009 | Saint Clair ................... 709/203 |
| 2009/0316707 | A1* | 12/2009 | Hawley et al. ............... 370/401 |
| 2011/0264286 | A1* | 10/2011 | Park ............................. 700/286 |
| 2012/0084472 | A1* | 4/2012 | Locascio et al. ............ 710/104 |
| 2013/0329746 | A1* | 12/2013 | Palacios Valverde et al. ............................ 370/401 |

FOREIGN PATENT DOCUMENTS

WO    WO03049445 A2    6/2003

* cited by examiner

*Primary Examiner* — Anh-Vu Ly
*Assistant Examiner* — Hector Reyes Ortiz
(74) *Attorney, Agent, or Firm* — Maginot, Moore & Beck, LLP

(57) ABSTRACT

Household communications network (1) comprising a plurality of network segments (2) which are coupled to one another via switches (3), subscribers (4) of the household communications network (1) each being connected to a port of a switch (3) via a connection line and being interconnected in pairs for communication by way of the switches (3).

12 Claims, 6 Drawing Sheets

HOME COMMUNICATION NETWORK

FIELD OF THE INVENTION

The invention relates to a household communications network comprising a plurality of network segments and in particular to an IP-based household communications network,

TECHNICAL BACKGROUND

Conventional household automation or household communications systems are closely linked to one product or manufacturer. In many cases, this means that only components from a particular manufacturer can be used. Therefore, devices or subscribers are often not compatible with one another. As a result, conventional household automation or household communication systems are inflexible, and can only be adapted to technical constraints or customer wishes with some difficulty.

SUMMARY OF THE INVENTION

The object of the present invention is therefore to provide a household communications network and a method for communication by subscribers of a household communications network which overcome the aforementioned drawbacks.

According to the invention, this object is achieved by a household communications network having the features specified in claim 1.

The invention provides a household communications network comprising a plurality of network segments which are coupled to one another via switches, subscribers of the household communications network each being connected to a port of a switch via a connection line and being interconnected in pairs for communication by way of the switches.

In this context, an access server for script-controlled data processing is connected to at least one switch of the household communications network.

The household communications network is an IP-based household communications or household automation system which can be expanded in terms of system functions in a simple manner.

The household communications system according to the invention is fully scalable and may comprise a plurality of subscribers or terminals.

In one possible embodiment of the household communications network according to the invention, the subscribers communicate while controlling the access server by exchanging data packets with one another.

In one possible embodiment of the household communications network according to the invention, the switches comprise power-over-Ethernet (PoE) switches.

In one possible embodiment of the household communications network according to the invention, the switches are multicast-capable.

In one possible embodiment of the household communications network according to the invention, the switches can each be configured via a command-line interface.

In one possible embodiment of the household communications network according to the invention, the configuration of the subscribers and switches of the household communication network is stored in the access server of the household communications network.

In one possible embodiment of the household communications network according to the invention, the subscribers contained therein comprise addressable household terminals, in particular household telephone terminals, door control devices, video cameras, video devices, door intercom devices, keypads, shutter control devices, switches, household lighting devices, motion detector devices, key read devices, card read devices, fingerprint recognition devices and household computer devices.

In one possible embodiment of the household communications network according to the invention, the subscribers can each be addressed via a MAC address or an IP address.

In one possible embodiment of the household communications network according to the invention, a remote subscriber is connected to the household communications network directly via a switch or over the Internet.

In an alternative embodiment of the household communications network according to the invention, a remote subscriber is connected to the household communications network over the Internet via a gateway which is connected to a port of a switch.

In one possible embodiment of the household communications network according to the invention, the access server comprises one or more interfaces for receiving data packets which are transmitted to the access server by a subscriber via a data network in accordance with a first data transfer protocol.

In one possible embodiment of the household communications network according to the invention, for each interface the access server has an associated protocol driver which converts the data contained in the received data packet into an internal data format of the access server.

In one possible embodiment of the household communications network according to the invention, the access server comprises a scripting engine, which loads a stored application program script which processes the received data, which are in the internal data format of the access server, in accordance with the application program instructions contained in the loaded application program script.

In one possible embodiment of the household communications network according to the invention, the received data, which are in the internal data format of the access server, are processed in accordance with the application program instructions contained in the loaded application program script by means of status points, which each specify a state of a device function of a subscriber.

In one possible embodiment of the household communications network according to the invention, the data processed by the access server are packed into data packets by a protocol driver of the access server and transmitted to a second subscriber via an interface of the access server in accordance with a second data transfer protocol.

In one possible embodiment of the household communications network according to the invention, the access server has interfaces, in particular a field bus interface, an SIP (session initiation protocol) interface, a web service interface, a telephone system interface and an SNMP interface.

In one possible embodiment, the field bus interface may be a KNX field bus interface.

The invention further provides a method for communication by subscribers of a household communication network comprising a plurality of network segments which are coupled to one another via switches, subscribers of the household communications network each being connected to a port of a switch via a connection line and being interconnected in pairs for communication by way of the switches.

In this context, an access server is connected to at least one switch of the household communications network, and processes data in a script-controlled manner.

In one possible embodiment of the household communications network according to the invention, the signalling between the subscribers is controlled by the access server.

In one possible embodiment of the household communications network according to the invention, the signalling between the subscribers takes place via the access server in accordance with an SIP (session initiation protocol).

SUMMARY OF THE DRAWINGS

In the following, possible embodiments of the household communications network according to the invention and of the method according to the invention for communication by subscribers of a household communications network are described with reference to the appended drawings.

DESCRIPTION OF THE EMBODIMENTS

Figure 1:
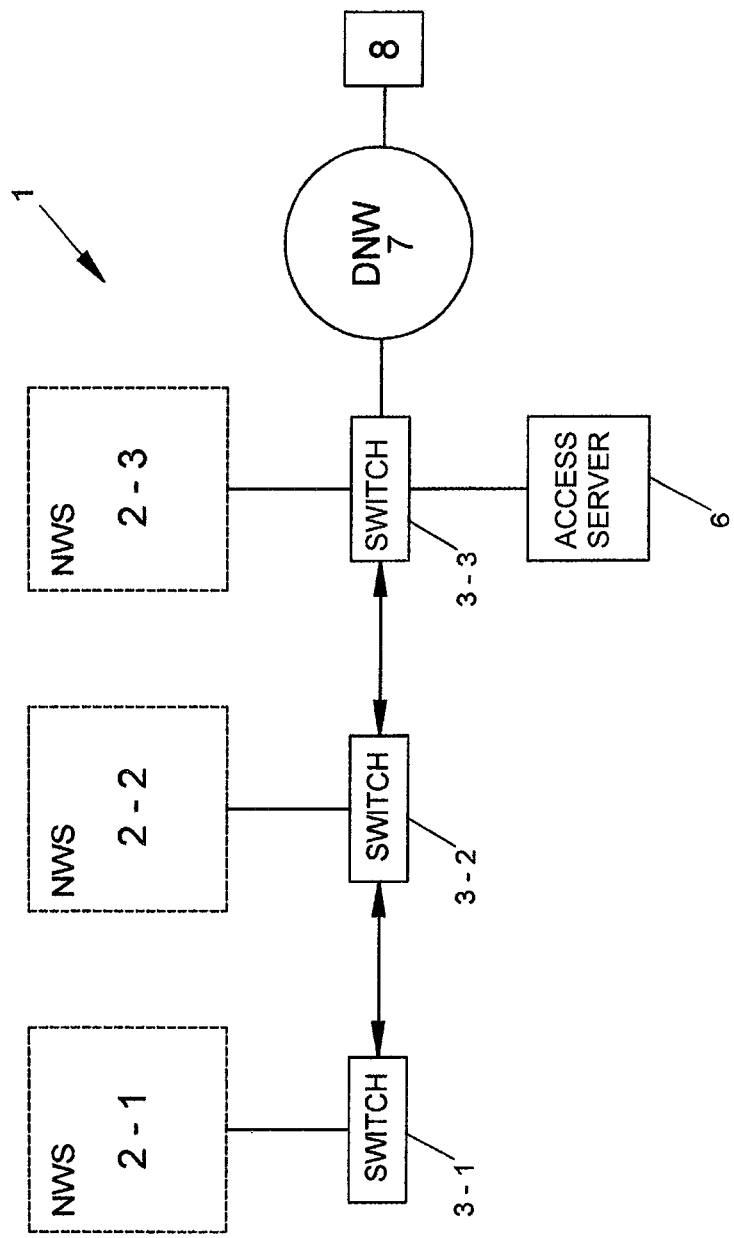
FIG. 1 is a diagram showing an embodiment of the household communications network according to the invention.

As can be seen from FIG. 1, in the embodiment shown, the household communications network 1 comprises a plurality of network segments 2-1, 2-2, 2-3, which are coupled or connected to one another via switches 3-1, 3-2, 3-3. In this context, subscribers 4-$i$ of the household communications network, as shown in FIGS. 2-2C, are connected to a switch 3.

Figure 2A:
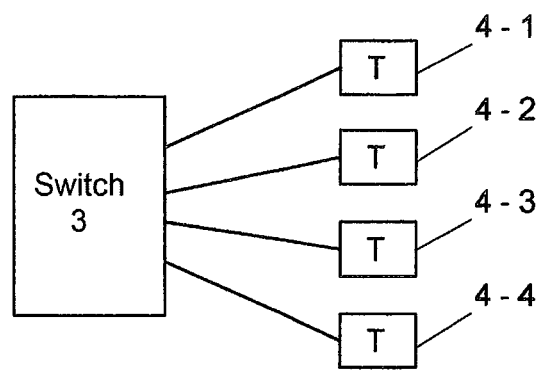
FIG. 2A, 2B, 2C show different variants for connecting subscribers to switches of the household communications network according to the invention as shown in FIG. 1.
Figure 2B:
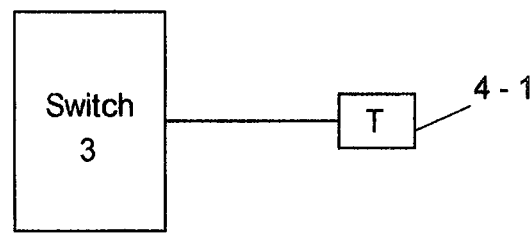
Figure 2C:
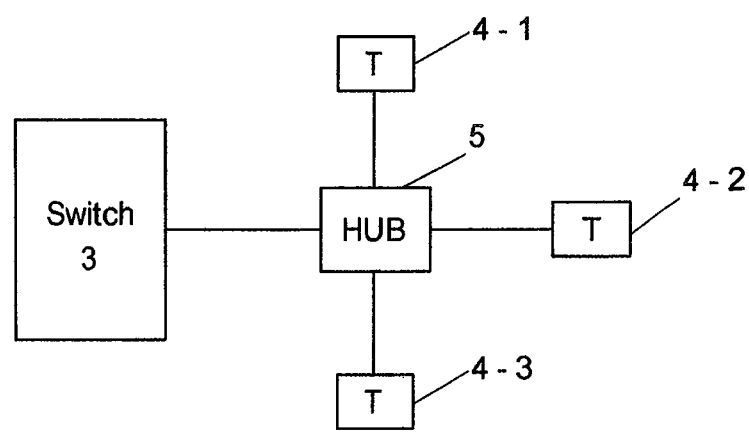

In the example shown in FIG. 2A, a plurality of subscribers 4-$i$ are connected to different ports of a switch 3. It is also possible for only one subscriber 4-1 to be connected to a switch, as shown in FIG. 2B. Further, switches 4-$i$ may be connected to a switch 3 via a HUB 5. The HUB 5 may form a multi-signal repeater which receives signals at one port and emits them again at all the other ports.

Using switches 3-$i$ as shown in FIG. 1 makes it possible to segment the household communications network 1 into network segments 2-$i$. An access server 6 is connected to the switch 3-3 shown in FIG. 1. The individual subscribers or terminals each have the connection line thereof to the port to themselves, and the switch connects subscribers to one another in pairs for the duration of the communication.

In a variant embodiment, the incoming frame or the data packets are merely analysed for the source and target addresses thereof by a switch 3. When the connection to the target address is being established, for example to the next node or switch 3 on the way to the target address, the frame or data packet is passed on without further analysis by the switch 3. If the target port is occupied, making it impossible to pass on the data packet immediately, the data is buffered in the respective switch 3 until the connection is free again.

Alternatively, the switch 3 may automatically store all incoming frames or data packets and if appropriate carry out an error check. The advantage of this embodiment is that defective frames or data packets can be discarded by the switch 3, preventing unnecessary strain on the household communications network 1.

The switches 3 form bridges comprising a plurality of ports, to each of which still only one subscriber is connected.

In the embodiment shown in FIG. 1, a remote subscriber 8 is connected to a port of the switch 3-3 via a data network 7. The data network 7 may for example be the Internet. It is possible for a subscriber to be connected to the household communications network 1 via a gateway. The different subscribers 4-$i$ communicate by controlling the access server 6 to exchange data packets or frames with one another. The access server 6 may process received data in a script-controlled manner. For this purpose, as shown in FIG. 1, the access server 6 has an interface or data interface for receiving data packets which are transmitted over the network by a subscriber 4 in accordance with a first data transfer protocol. In the access server 6, an associated protocol driver may be provided for each data interface of the access server 6, and converts the data contained in the received data packets into an internal data format of the access server 6. The access server 6 preferably has a scripting engine, which loads a stored application program script, which processes the received data, which are in the internal data format, in accordance with the application program instructions contained in the loaded application program script. The data processing by way of the loaded application program script is preferably carried out by way of what are known as status points SP, which each specify a state of a device function of a subscriber 4-$i$. the access server 6 preferably further has a server kernel. This server kernel comprises primary basic services, in particular message exchange service for internally exchanging messages within the access server 6, a database service for providing configuration data, and a data store service for providing runtime data of all of the services to the access server 6. Aside from the primary services or basic services, the access server 6 preferably provides network services for the household communications network 1 according to the invention as secondary services. In one possible embodiment, these network services comprise a DHCP (dynamic host configuration protocol) service for assigning IP addresses to the subscribers 4, 8, a DNS (domain name system) service for address resolution, an NTP service for timing synchronisation, and a TFTP (trivial file transfer protocol) service for data transfer between subscribers 4, 8 and the access server 6.

The access server 6 of the household communications network 1 according to the invention may comprise various interfaces aside from the data interfaces. The interfaces preferably comprise at least one field bus interface, in particular a KNX field bus interface. Other interfaces are an SIP (session initiation protocol) interface and a web service interface. Further, the access server 6 may have a telephone system interface and an SNMP interface.

The household communications network 1 according to the invention preferably comprises a central access server 6, as shown in FIG. 1. Alternatively, a plurality of decentralised servers or access servers which form a server cluster may also be provided. In one possible embodiment, the access server 6 has a script program memory. An application program script is loaded from the script program memory by the scripting engine of the access server 6, and the application program instructions contained in the loaded application program script are preferably interpreted by an interpreter. The interpreter may either run the source code of the application program script directly or translate the source code of the application program script into an intermediate code and subsequently run this intermediate code. It is further possible for the interpreter to run a precompiled code of the loaded application program script.

The different subscribers 4, 8 may each provide one or more device functions. These device functions may comprise both sensor functions and actuator functions. As runtime data, the data store service of the access server provides status points SP, which each specify a state of a device function of a subscriber 4, 8. In this context, a configurable data type, which is provided by the database service of the server kernel of the access server 6, may be fixedly assigned to each status point SP. In this context, a change of value of a status point SP preferably constitutes a trigger event, which leads to the scripting engine of the access server 6 being activated to load an application program script assigned to the respective status point SP from the script program memory of the access server 6, using the configuration data provided by the database service of the server kernel. Using the loaded application program, as a function of the trigger event induced by the value change of a status point SP, the value of at least one other status point of a device function of a subscriber 4, 8 is changed as a subsequent event. When a subsequent event is brought about by the loaded application program script, the access server 6 actuates at least one associated device function of another subscriber in which processed data are transmitted to the respective subscriber 4, 8 in a data packet as control data.

In one possible embodiment, the value change of a status point SP induced by an application program script as a result of a trigger event or of a subsequent event is reported in a message by the access server, by way of the configuration data provided by the database service of the access server 6, to other application program scripts which have subscribed to a notification of this type in accordance with the configuration data of the access server 6. In one possible embodiment, the server 6 is connected via an interface to a display device of a user, which displays the value change of a status point SP to the user.

In the embodiment shown in FIG. 1, switches 3-*i* are used as active network components. In large household communications networks 1, routers may additionally be used. The household communications network 1 shown in FIG. 1 can be integrated into an existing network infrastructure or IP network infrastructure. In this context, the household communications network 1 preferably communicates from an existing network by way of VLAN. The switches 3 shown in FIG. 1 can be standardly equipped with 10/100 Mbit/second Ethernet ports. The number of ports per switch 3-*i* may vary. For example, the ports 3-*i* contain 8-12 ports for 8-12 different subscribers. In larger household communications networks 1, the switches 3 may each contain 24-48 ports. In household communications networks 1 in which there is more than one switch, structured star-shaped wiring may be used, taking into account the load that is provisionally expected to occur in the household communications network 1. In particular the core switches, in other words the primary splitters, are correspondingly configured and generally connected at at least 1000 Mbit/sec. To power the respectively connected subscribers or terminals 4, 8, the switches 3-*i* are preferably equipped with power-over-Ethernet technology. Switches of this type are able to power subscribers at up to 15.4 watts per port. Alternatively, network components for powering PoE terminals are provided. The switches 3-*i* are preferably configured using a command-line interface. The switches 3 preferably further support VLANs on a port basis and on a dynamic MAC address basis. The switches 3 preferably further support IGMP Multicast Snoopings RFC 2236. Further, there is preferably unitary SNMP management of the switches 3-*i*. IGMP snooping prevents multicast traffic of all of the active ports of a switch from being distributed (broadcast).

FIGS. 3 to 8 show various network scenarios for the household communications or household automation system 1 according to the invention. The system is capable of reproducing various communications and data services on an IP-based network infrastructure in a building. In this context, the system is open and flexible as regards the different building structures.

Figure 3:
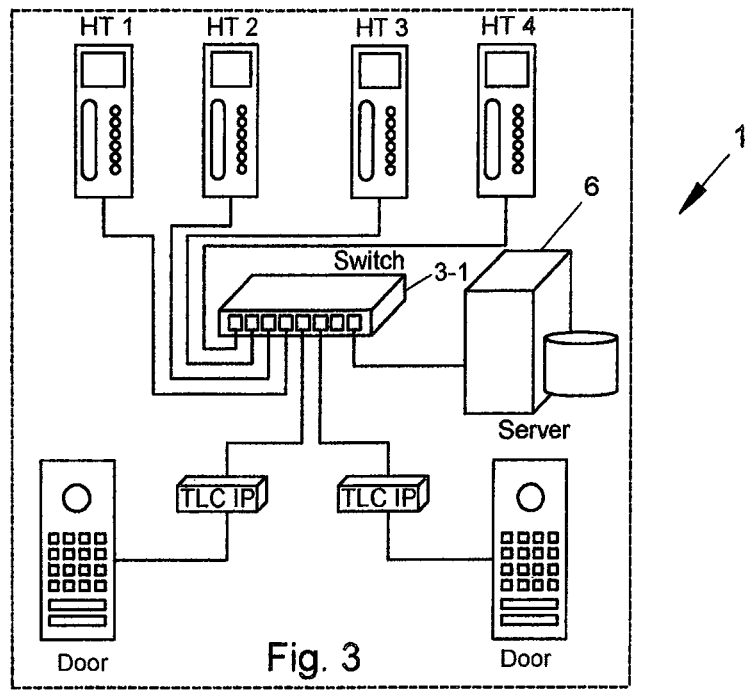
FIG. 3-8 show different embodiments of the household communications network according to the invention.

FIG. 3 shows a network scenario in which a door and household communications system 1 is operated as an island solution. At the smallest expansion stage, the island solution contains two system subscribers, in addition to an access server 6 and a switch 3-1. FIG. 3 depicts a system in the form of an island solution comprising two doors, four telephone points, a switch 3-1 and an access server 6. The wiring shown is only a rough sketch and is not representative of structured wiring for a user or subscriber. The system subscribers can in principle be randomly addressed. The access server 6 controls the connection and disconnection and the distribution of the audio and video data. For maintenance and configuration work, there is also the option of logging onto the IP network using a PC.

Figure 4:
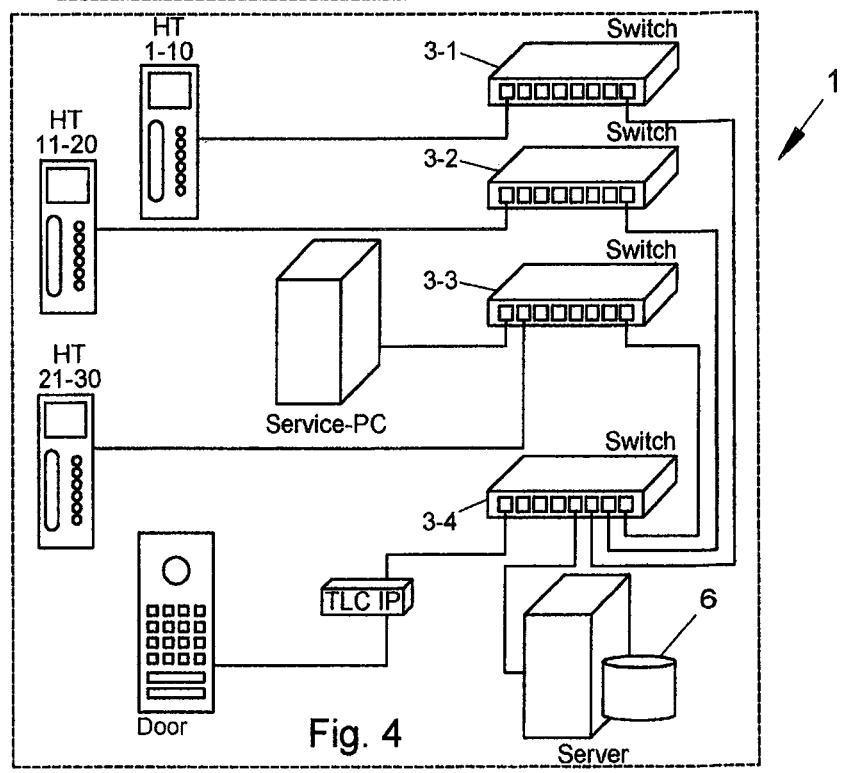

FIG. 4 shows a further network scenario involving a somewhat larger system comprising a door and a plurality of telephone points. These are distributed over a plurality of floors in a building. The difference from the example shown in FIG. 3 is the larger number of subscribers and the somewhat larger network infrastructure required. For this number of terminals, a plurality of switches 3-1, 3-2, 3-3, 3-4, networked to one another, are required in the network shown. In the network scenario shown, a service PC having permanent network access is additionally permanently installed for a homeowner or system manager.

Figure 5:
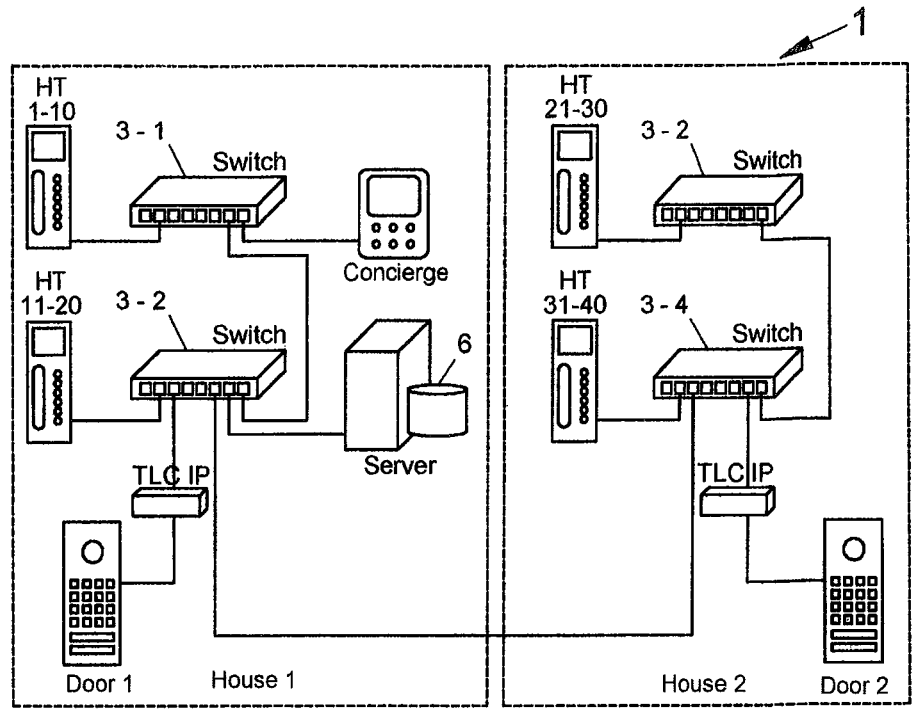

FIG. 5 shows a further network scenario in which an access server 6 is used for script-controlled data processing. In the example shown, the terminals are distributed over two buildings. The concierge device found in the first building or the display device is responsible for the entire system 1. In the simplest case, the connection between the buildings in the network scenario shown may be established via an Ethernet direct connection. The transmission paths are for example fast or gigabit Ethernet via a fibre-optic connection or via copper-based wiring. One possible application is for example the connection of a second auxiliary building comprising a few subscribers to the access or household communications or household automation system 1, it being too complicated to provide a second server in this case.

Figure 6:
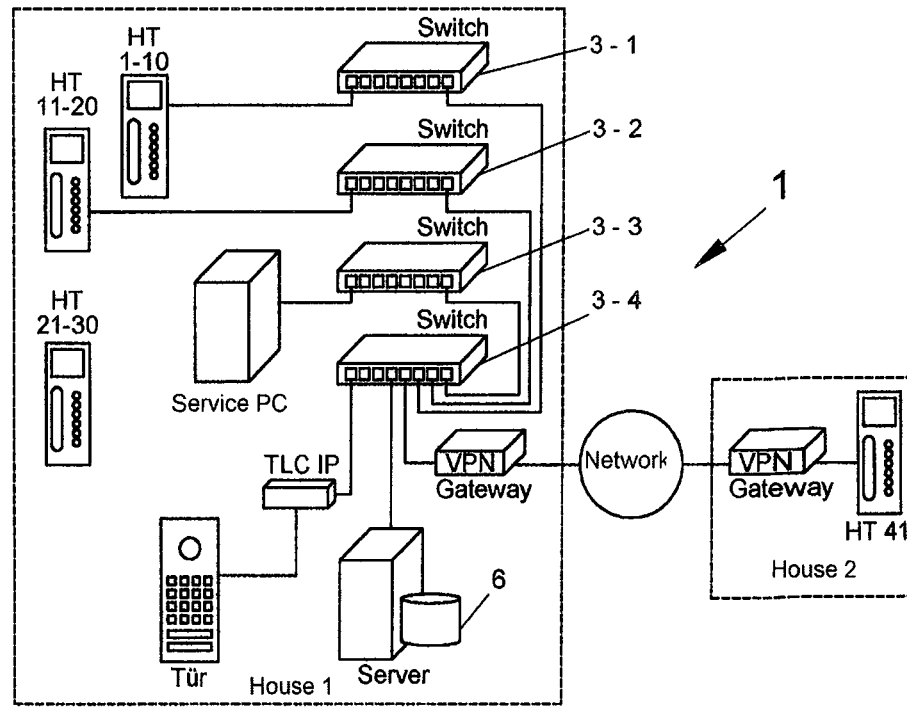

FIG. 6 shows a further application of a household communications and household automation system 1 which uses an access server 1 for script-controlled data processing. In the network scenario shown, a remote subscriber or user is connected to the system 1 using a gateway. From the point of view of the household communications or household automation system 1, there is no difference between the remote and the local subscriber or device. In the example shown, the remote subscriber is connected to the communications or household automation system 1 via a VPN tunnel. One application would be a pharmacist who can only be reached privately in a house outside the pharmacy's business hours and can thus react to emergencies.

Figure 7:
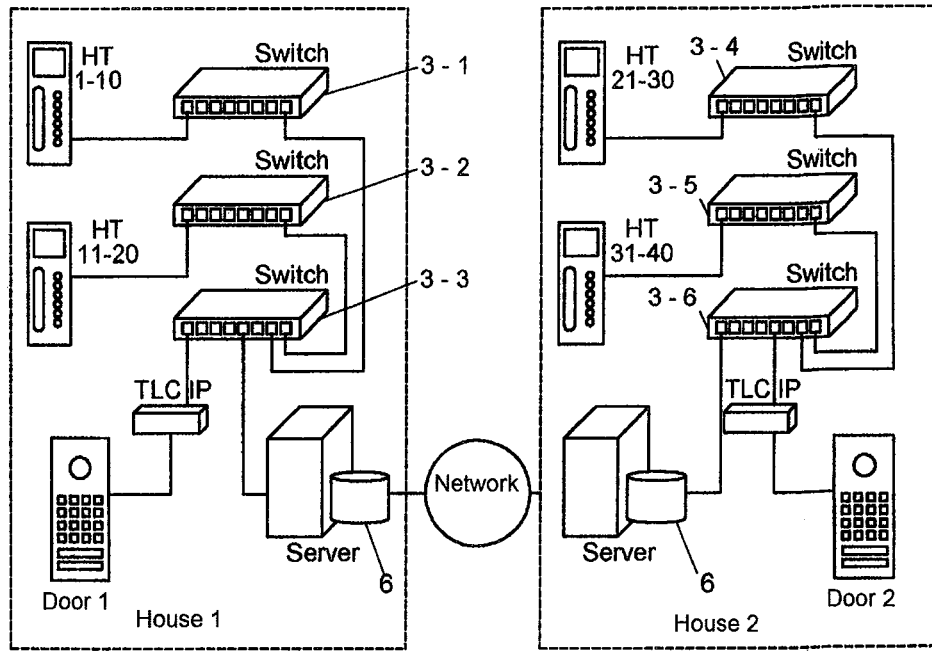

FIG. 7 shows a further network scenario for a household communications or household automation system 1 which uses an access server 6 for script-controlled data processing. In the application scenario shown in FIG. 7, two independent networks are interconnected and synchronised. Each of the two sub-networks has its own server 6. In this context, the connections within the first house operate entirely independently of the connections within the second house. Via the internetwork connections, the servers 6 involved pass on a message or call to the desired target network. In the example shown, the two adjacent networks are connected via a VPN tunnel via a gateway. In one possible embodiment, the servers 6 may be synchronised via a second network card. One application of the network scenario shown in FIG. 7 would be for example a large housing estate comprising a plurality of houses. In this context, in each house, the internal connections within its own network are provided. For example, receptionists have the option of calling all subscribers, comprehensively over all of the servers 6, and conversely all of the subscribers can call the receptionist.

Figure 8:
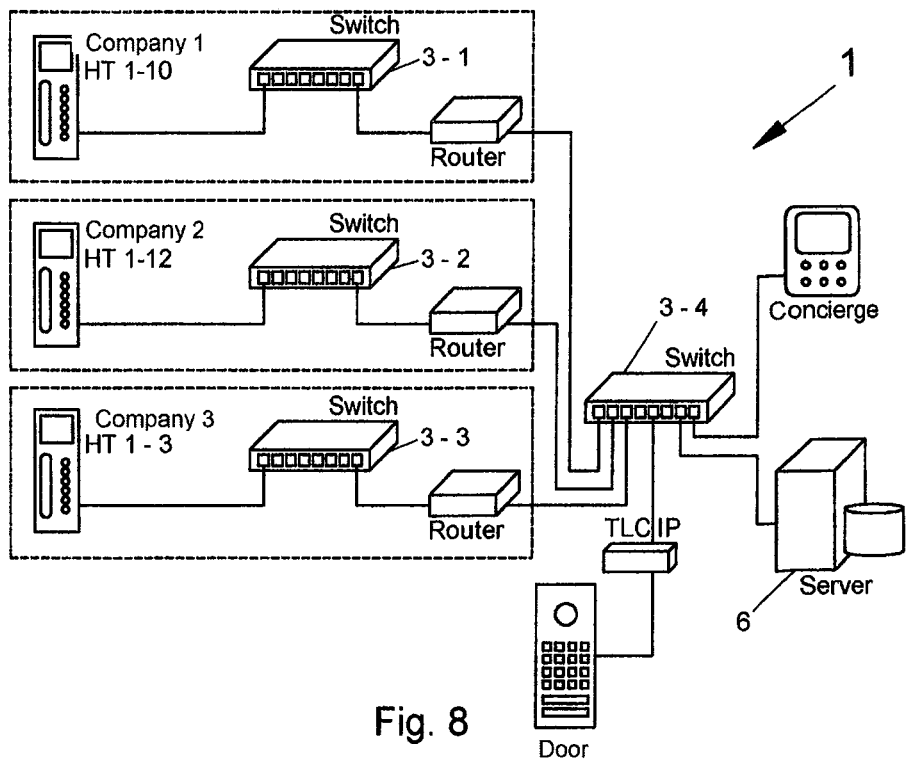

FIG. 8 shows a further network scenario for a household communications or household automation system 1 according to the invention. By way of example, FIG. 8 shows the situation in a building comprising a plurality of individually independent networks, these independent networks for example being used by different companies. Therefore, in this application gateways or routers are used so as to separate the respective networks from the central access network. Configuration may take place within the local networks independently of the other networks.

Figure 9:
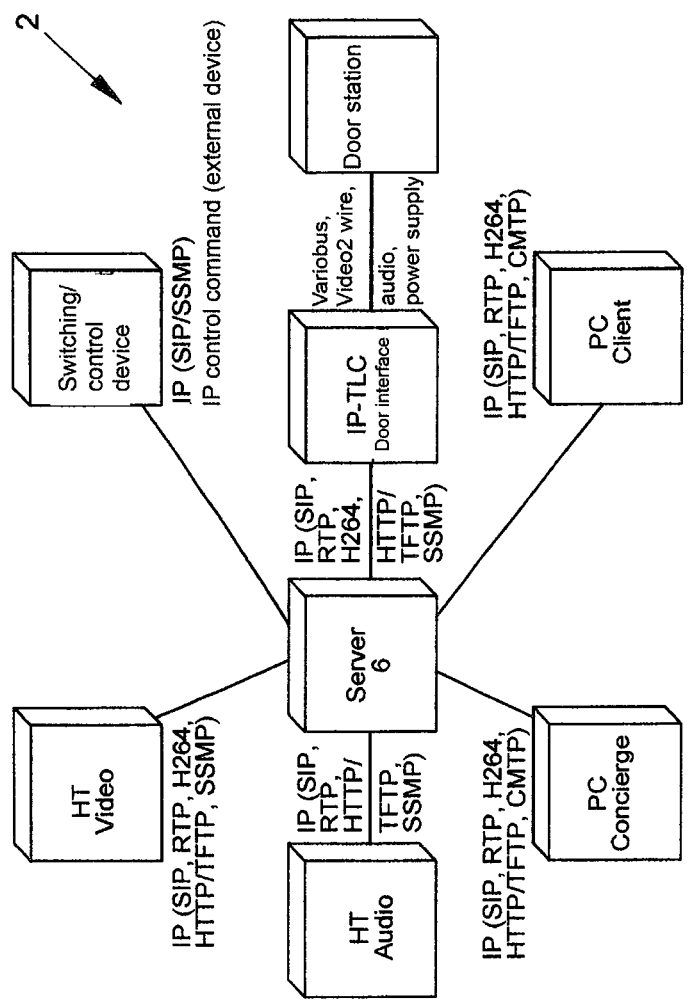
FIG. 9 schematically shows a household communications network according to the invention on the protocol level.

FIG. 9 shows schematically the composition of the household communications or household automation system according to the invention, comprising an access server on the protocol level. As can be seen from FIG. 9, the system according to the invention uses ICP/IP protocols having corresponding extensions. Furthermore, standard protocols such as RTP, RTCP, SNMP, FTP/TFTP, HTTP and HTTPS may be used. A proprietary protocol, such as SSMP (Siedle SIP message protocol) may additionally be provided for signalling/control for terminals. As a further protocol, a protocol for signalling or control for a display device or PC may further be used.

Signalling is preferably based on the SIP standard family. In this context, as a matter of principle the signalling always goes via the access server 6, which contains an SIP protocol driver. The audio and video data are preferably also always passed via the access server 6. The SIP server service for control passes on calls of corresponding subscribers and controls the distribution of the audio and video data. In this context, it is possible to send the audio and video data to different devices or terminals, the management of the IP addresses for RTP being configured within SIP. For the subscriber or a device 4, an individual keepalive may be configured, in other words a particular defined timeframe in which the subscriber 4 has to respond to the access server 6. In one possible variant, this can be implemented using a UDP socket, in which a subscriber 4 or a device can confirm its presence cyclically. Further, an SIP register which is to be repeated regularly or a Nat refresh may be used.

Different protocols are used in the household communications or household automation system 1 for the communication between the subscribers or devices 4 and the system management, depending on the application. In this context, alongside the standard communications protocols, such as SIP, STP, RTP, HTTP etc., proprietary protocols may also be used for the data exchange to control the terminals using the server 6, for example the SSMP protocol (Siedle SIP message protocol). Calls or messages may have different priority levels. Calls of the same type generally have one priority level. Further, time-outs may be implemented in the server 6 at different points so as to release frozen processes and unnecessarily occupied paths. Further, in this way subscribers 4 who have dropped out can be detected. In the household communications and household communications system 1 according to the invention, the access server 6 recognises the logical connection of the subscribers 4. This ensures that all of the devices or terminals in the system can cooperate and communicate with one another so long as the access server 6 is able to address them, even across network boundaries, irrespective of whether these are SIP terminals comprising a KNX control device or ISDN telephone lines.

In one possible embodiment of the household communications or household automation system 1 according to the invention, the data traffic is secured, in other words encrypted. In this context, all of the terminals contain a secret key, known as a private key. This cryptographic key may be the same for all of the terminals. In this case, the server 6 has to store a counterpart key known as the public key, for all of the devices in the system 1. The private key of the terminals can be transmitted when logging on to the server 6 and is also secured using a known "shared secret" which is only used at this point. Preferably, each data packet of the terminals is signed using the cryptographic key of the terminal, that is to say the private key, in combination with a timestamp. Further, the system time can be synchronised by the server 6 at particular time intervals. Data packets may have a particular validity period, for example a period of 120 seconds. This effectively prevents what are known as replay attacks.

The invention provides an IP-based communication or household automation system 1 which can be expanded in terms of system functions in a simple manner. The integrated, IP-based household communications or household automation system 1 2 can integrate different areas of communication, security, household automation or building automation. The system 1 according to the invention is fully scalable and may comprise a plurality of subscribers or terminals. It further has a high level of system security and system stability. It makes central control and coordination by the access server 6 possible. The system according to the invention further means that alarm and emergency call management can readily be integrated. It further offers typical functions based on telephone systems and control and automation functions. The system 1 according to the invention makes a plurality of simultaneous speech and video connections possible. In this context, external products or devices can readily be linked in. The system 1 according to the invention further offers highly convenient configuration and update functions. Any desired special-purpose solutions can be implemented in a simple manner. The power supply for the subscribers or devices 4 can be provided for example via PoE (power over Ethernet). The devices or network components used in the household communications or household automation system 1 according to the invention comprise both passive and active network components. The active network components comprise for example audio HT devices and video HT devices. The active network components or devices further comprise actuable doors. Further example of active network components which are used include switches 3 or routers, which make it possible to integrate the household communications or household automation system 1 according to the invention into an existing IP network infrastructure. In this context, the household communications or household automation system 1 according to the invention is preferably separated from an existing network by VLAN. The switches 3 may for example be equipped with 10/100 Mbit Ethernet ports. Switches 3 for smaller networks comprise for example 8 ports, whilst switches 3 for larger networks may even have 24 ports. For supplying power to the respectively connected terminals, the switches 3 may be equipped with PoE (power over Ethernet). Further examples of active components or devices which may be used are what are known as media adapters. An adapter may for example be provided for transmission via fibre optics and for transmission via a power supply network (power line).

As further active network components or devices, gateways or routers are provided. Gateways are provided when networks are to be interconnected but a direct connection is not possible. This may for example be necessary for security reasons in different protocols or in the event of incompatible physical interfaces. Subscribers or devices can be connected to the system directly or via a gateway over the Internet. The different devices used in the household communications and household automation system 1 according to the invention can preferably be addressed via an address. These devices comprise for example video cameras, motion detectors, electronic key readers, fingerprint recognition devices, call displays, light modules, key switches, house number displays, keypads, card readers and door intercom devices. The terminals may further be telephone devices, which may be either permanently installed or portable. Further examples include video devices for doors, garages or blinds or shutters.

The invention claimed is:

1. Household communications network comprising a plurality of network segments which are coupled to one another via switches, a plurality of subscribers of the household communications network each being connected to a port of a switch via a connection line and being interconnected in pairs for communication by way of the switches;
wherein an access server of the household communications network for script-controlled data processing is connected to at least one switch, the access server comprising:
at least one interface for receiving data packets which are transmitted over the network by each subscriber in accordance with a first data transfer protocol, an associated protocol driver being provided for each data interface and converting the data contained in the received data packets into an internal data format of the access server, and
a scripting engine, which loads a stored application program script, which processes the received data, which are in the internal data format, in accordance with the application program instructions contained in the loaded application program script by means of status points, which each specify a state of a device function of a first subscriber in the plurality of subscribers, wherein a change of value of a first status point constitutes a trigger event from the first subscriber, which leads to the scripting engine of the access server being activated to load an application program script assigned to the respective status point from a script program memory of the access server, and execute the script to modify a second status point of a second subscriber in the plurality of subscribers using configuration data provided by a database service of a server kernel of the access server, and
the processed data being packed into data packets by a protocol driver of the access server and transmitted to a second subscriber of the household communications network via an interface of the access server in accordance with a second data transfer protocol.

2. Household communications network according to claim 1, wherein the subscribers of the household communications network communicate with one another via the access server of the household communications network by exchanging data packets.

3. Household communications network according to claim 1, wherein the switches comprise PoE (power-over-Ethernet) switches.

4. Household communications network according to claim 1, wherein the switches comprise multicast switches.

5. Household communications network according to claim 1, wherein the switches can be configured via a command-line interface.

6. Household communications network according to claim 1, wherein a configuration of the subscribers and switches is stored in the access server of the household communications network.

7. Household communications network according to claim 1, wherein the subscribers are addressable household terminals, which comprise household telephone terminals, door control devices, video cameras, video devices, door intercom devices, keypads, shutter control devices, switches, household lighting devices, motion detector devices, key read devices, card read devices, fingerprint recognition devices and household computer devices.

8. Household communications network according to claim 1, wherein the subscribers can each be addressed via a MAC address or an IP address.

9. Household communications network according to claim 1, wherein a remote subscriber is connected to the household communications network directly via a switch or over the Internet via a gateway which is connected to a port of a switch.

10. Household communications network according to claim 1, wherein the interfaces of the access server comprise one or more of the following interfaces:
a field bus interface, in particular a KNX interface,
an SIP (session initiation protocol) interface,
a web service interface,
a telephone system interface, and
an SNMP interface.

11. Method for communication by subscribers of a household communication network comprising a plurality of network segments which are coupled to one another via switches,
a plurality of subscribers of the household communications network each being connected to a port of a switch via a connection line and being interconnected in pairs for communication by way of the switches,
wherein at least one access server, via which signaling between the subscribers takes place, is provided for script-controlled data processing,
the access server comprising:
at least one interface for receiving data packets which are transmitted over the network by each subscriber in accordance with a first data transfer protocol, an associated protocol driver being provided for each data interface and converting the data contained in the received data packets into an internal data format of the access server, and
a scripting engine, which loads a stored application program script, which processes the received data, which are in the internal data format, in accordance with the application program instructions contained in the loaded application program script by means of status points, which each specify a state of a device function of a first subscriber in the plurality of subscribers, wherein a change of value of a status point constitutes a trigger event, which leads to the scripting engine of the access server being activated to load an application program script assigned to the respective status point from a script program memory of the access server, and execute the script to modify a second status point of a second subscriber in the plurality of subscribers using configuration data provided by a database service of a server kernel of the access server, and the processed data being packed into data packets by a protocol driver of the access server and transmitted to a second subscriber of the household communications network via an interface of the access server in accordance with a second data transfer protocol.

12. Method according to claim 11, wherein the signaling via the access server takes place in accordance with an SIP (session initiation protocol).

* * * * *